Oct. 19, 1954

T. I. RESS 2,692,301

STYLUS MECHANISM AND SYSTEM

Filed Dec. 15, 1949

INVENTOR.
Thomas I. Ress
BY
Thiess, Olson & Mecklenburger
Att'ys

Patented Oct. 19, 1954 2,692,301

UNITED STATES PATENT OFFICE 2,692,301

STYLUS MECHANISM AND SYSTEM

Thomas I. Ress, Chicago, Ill., assignor to Consolidated Electric Company, Chicago, Ill., a corporation of Illinois Application December 15, 1949, Serial No. 133,153

1 Claim. (Cl. 178—18)

This invention relates to writing apparatus, such for example as tele-autographic apparatus, more particularly to writing stylus mechanism for such writing apparatus, and it is an object of the invention to provide improved mechanism of this character.

One form of writing apparatus of the character suggested above is disclosed in Patent No. 2,583,535, issued January 29, 1952, to Robert Adler, and assigned to the same assignee as the present invention.

In writing apparatus such as that described in the application referred to, the writing of a message at one station, i. e. the transmitter, produces signals which are transmitted to a second station, i. e. the receiver, and causes reproduction there of the written message, the writing being done at both stations by means of a stylus engaging a writing surface such as paper, for example. The stylus and the writing surface, respectively, may be of any character such that a legible and relatively permanent record is made. Thus the writing surface may be a treated paper, as, for example, a waxed paper, upon which a stylus leaves a mark by virtue of pressure or heat applied thereby.

It is another object of the invention to provide improved writing apparatus in which a stylus is forced into and out of contact with a writing surface by electromagnetic action.

It is another object of the invention to provide improved writing apparatus having electromagnetic means for alternatively maintaining a stylus in contact with or out of engagement with a writing surface.

It is another object of the invention to provide improved writing apparatus in which electromagnetic means are arranged to hold a stylus in contact with or out of engagement with a writing surface alternatively, said means also serving to heat such stylus while in either position whereby it may better write on a treated writing surface.

According to one embodiment of the invention, a pair of axially aligned electromagnetic coils are arranged in the stylus mechanism, these coils surrounding a portion of the length of the stylus proper and being axially displaced from each other. The stylus proper includes two longitudinally displaced sections of magnetic material and an interposed section of nonmagnetic material. The spacing between the magnetic portions differs substantially from the spacing between the two electromagnetic coils whereby alternate excitation of the two coils results in movement of the stylus proper as one or the other of the two magnetic sections thereof tends to center itself in the energized coil. Energization of one coil causes the stylus proper to be elevated and maintained out of contact with the writing surface while energization of the other coil forces the stylus into contact with the writing surface, both of these actions being made under the influence of the electromagnetic coils without dependence upon gravity or springs or other mechanical devices.

This invention, together with further objects and advantages thereof, will best be understood by reference to the following description taken in connection with the accompanying drawing, and its scope will be pointed out in the appended claims.

In the drawing, in which like parts are indicated by like reference numerals:

Figure 1:
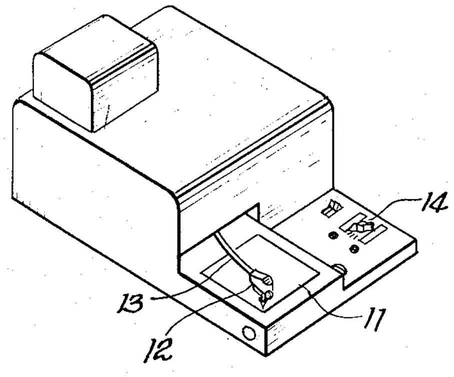
Fig. 1 is a perspective view of tele-autograph apparatus containing an embodiment of the invention.

The writing apparatus shown in Fig. 1 is a combination transmitting and receiving station for a tele-autograph system. This apparatus is used in conjunction with remotely located identical apparatus, not shown in the drawing, the two stations being electrically interconnected, preferably for direct signal transmission such as through a cable.

When the tele-autograph apparatus shown in Fig. 1 is utilized as a transmitting station, a message is written on a writing surface 11 by means of a stylus mechanism 12. The writing surface may be ordinary paper in which case the stylus mechanism includes a pencil or pen, or the writing surface may be of a substance which is sensitive to pressure or temperature or both in which case there may be employed a metallic stylus which may be heated.

The stylus mechanism 12 is mounted at the free end of a link 13 the motions of which are transformed into electric signals which are transmitted to a receiving station and cause a corresponding stylus mechanism at that station to trace the same figures as those appearing on the writing surface 11 of the transmitting station. The writing apparatus may be changed from transmitting condition to receiving condition by operation of a switch 14 whereupon movements of the stylus at the remote station will be duplicated by the stylus 12, these movements being recorded on the writing surface 11. Since the tele-autograph apparatus shown in Fig. 1 may be of any suitable design and, more specifically, may be as described in Patent No. 2,583,535 referred to above, it is not described in detail in this application.

Figures 2, 3:
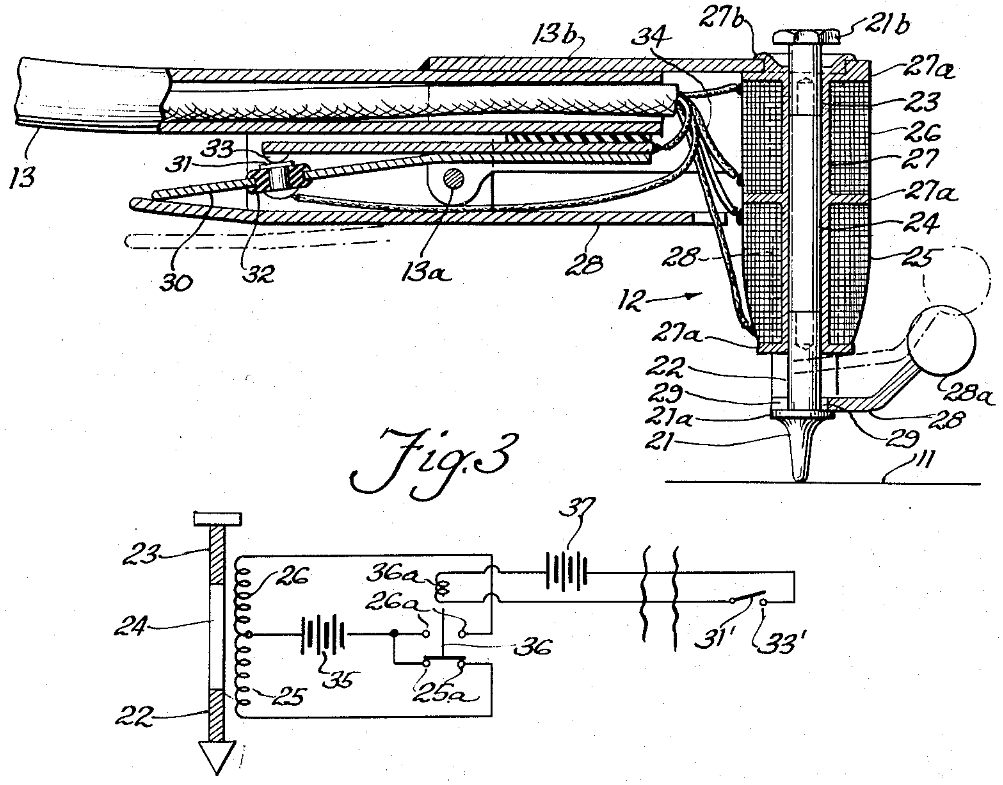
Fig. 2 is an enlarged view, partially in cross section, of stylus mechanism forming a part of the apparatus shown in Fig. 1.
Fig. 3 is a circuit diagram illustrating a preferred form of electrical control for the stylus mechanism shown in Fig. 2.

The stylus mechanism, as may be seen in Fig. 2, contains a stylus 21, the shank of the stylus including a lower magnetic portion 22, an upper magnetic portion 23, and an intermediate nonmagnetic portion 24. Surrounding the shank portion of the stylus is a pair of coils 25 and 26, these coils being secured to the free end of the link 13 through a nonmagnetic sleeve 27. This sleeve includes a cylindrical portion lining the inner surface of the coils, radially extending portions 27a at the ends of each coil, and a flange portion 27b at the upper end by which it is secured to the link 13 through a link extension 13b. The stylus 21 is guided by and is freely slidable within the sleeve 27.

The magnetic portions 22 and 23 of the stylus shaft are separated by a distance greater than that between the centers of the magnet coils 25 and 26. Consequently, energization of the coil 25 attracts the magnetic portion 22, and hence the stylus 21, upwardly, while energization of the coil 26 urges the portion 23 and the stylus 21 downwardly.

A stylus operating arm 28 is pivoted about a point 13a on the link 13, this arm extending vertically along one side of the coils 25 and 26 and having a ball portion 28a at its free end to be engaged by a suitable form of stylus, not shown. The arm 28 has a slot 29 through which the shank of the stylus freely passes, the stylus having an enlarged portion or shoulder 21a whose diameter is larger than the width of the slot 29, and through contact with which the operating arm 28 can force stylus 21 downwardly into contact with the writing surface 11. A flange 21b at the upper end of the stylus 21 is adapted to engage the upper end of the coil structure and thereby to limit the downward movement of the stylus.

A spring 30 is secured to the link 13 and resiliently urges the left-hand end of the operating arm 28 downwardly with sufficient force to maintain the right-hand end of the operating arm normally in its raised position, indicated by the dotted lines in Fig. 2.

An electrical contact 31 is mounted on the spring 30, this contact being electrically insulated from the spring by the grommet 32. The contact 31 cooperates with a stationary contact 33, the contacts normally being separated but being forced into engagement when the ball portion 28a of the operating arm 28 is forced downwardly against the action of the spring 30.

A series of electrical conductors 34 extend along the link 13 and interconnect the coils 25 and 26 and the contacts 31 and 33 with the stylus mechanism associated with the remote teleautograph station previously mentioned.

The coils 25 and 26 are shown in Fig. 3 as being actuated through a simple electric circuit including a battery 35 and a relay 36. When the relay 36 is in its normal position as illustrated in Fig. 3, it closes a circuit through the contacts 25a, and the coil 25 is energized, whereupon the lower magnetic portion 22 of the stylus shaft is urged upwardly toward the center of the coil 25 and the stylus is raised. When the relay 36 is energized, the contacts 26a will be closed and the coil 26 energized whereupon the upper magnetic portion 23 of the stylus shaft will be urged downwardly toward the center of the coil 26 and the stylus 21 will be forced downwardly into contact with the writing surface 11.

Whichever of the coils 25 and 26 is energized will have a power loss as a result of the resistance inherent therein. Proper selection of the coil resistance in view of the voltage to be applied and the thermal characteristics of the stylus mechanism will result in the maintenance of the stylus proper approximately at a desired temperature since one of the coils is always energized when the apparatus is in operating condition. This will permit the stylus to leave an intelligible mark on a wax-coated paper with a minimum of stylus pressure and will result in a reduction of friction between the stylus and the paper.

The relay coil 36a of the relay 32 is shown as being energizable by a battery 37 when a circuit is completed therebetween through remotely located switch contacts 31' and 33', these contacts being located at the remote tele-autograph station and corresponding to the contacts 31 and 33 shown in Fig. 2. The apparatus shown in Fig. 3 appearing at the left is the apparatus necessary to cause the proper operation of the writing stylus mechanism as a receiving unit. The switch contacts 31' and 33' and, if desired, the battery 37 are arranged in association with the stylus mechanism which is functioning as a transmitting unit. It is apparent that if each stylus mechanism is to operate alternatively as a transmitting unit and a receiving unit, each must be equipped with the necessary receiving apparatus shown at the left of Fig. 3 and the switch contacts shown at the right.

Let it be assumed that the switch 14 for the stylus mechanism, shown in Fig. 2, is set in the receiving position and that a corresponding switch at an interconnected station is set in transmitting position. When the operating arm at the remote station is moved downwardly to force the stylus into contact with the writing surface at that station, the switch contacts 31' and 33' shown schematically in Fig. 3 will be closed. This permits the battery 37 to energize the relay coil 36a which in turn results in the de-energization of coil 25 and the energization of coil 26. The stylus 21 will then move downward into contact with the writing surface 11 as previously explained.

When the operating arm at the remote station is released, it will rise under the influence of its spring, corresponding to spring 30, and the contacts 31' and 33' will open. This causes de-energization of the relay 32, re-energization of the coil 25, and raising of the stylus 21 out of contact with the writing surface 11.

Similarly, if the switch 14 is moved to the transmitting position while the corresponding switch at the remote station is moved to the receiving position, the raising and lowering of the operating arm 28 to force the stylus 21 into and out of contact with the writing surface 11 will operate the switch contacts 31 and 33, this causing raising and lowering of the stylus at the remote station in the same manner as described above.

It is to be noted that when the stylus of the receiving apparatus is moved downward into contact with the writing surface by energization of the coil 26 the operating arm 28 associated therewith remains elevated under the influence of the spring 30, and the contacts 31 and 33 associated with the receiving apparatus remain open. Consequently, the stylus elevating coil 25 of the transmitting apparatus remains energized with the result that when the operating arm 28 of the transmitting apparatus is released the stylus associated therewith will rise under the influence of the coil 25.

In well-known stylus mechanisms the stylus is urged downwardly by the force of gravity and it is returned to its upper position by an electromagnetic coil. In these well-known mechanisms a light spring has been used to overcome residual magnetic effects and minor frictional forces which may prevent gravity from lowering the stylus. The structure of the present invention avoids the use of a spring and provides a more positive acting mechanism.

The stylus mechanism shown in the drawings and described above resiliently but forcibly urges the stylus either into or out of contact with the writing surface through the use of separate electromagnet coils. The two coils, being alternatively energized, are independent of each other in their operation, and, consequently, may be designed such that each one exerts a desired amount of force upon the stylus, as conditions warrant. The coil 26, for example, may be made to exert a force on the stylus in accordance with the stylus pressure desired while the coil 25 may be made to exert a force on the stylus of whatever magnitude is desired to raise the stylus, the effectiveness of either coil having no bearing on the effectiveness of the other. At the same time there are required no stylus-operating springs which may deteriorate or become jammed.

As shown, stylus 21 has two magnetic portions, each one cooperating with one of the coils 25 and 26. This arrangement is preferred for purely practical reasons based on such factors as the spacing between coils and the desired amount of movement of the stylus. It will be apparent that if a greater amount of movement were required or if the coils 25 and 26 were more closely spaced, a single magnetic portion might be used in which case excitation of the coil 26 would raise the stylus and excitation of the coil 25 would lower the stylus, the basic requirement being means for establishing alternatively two spaced magnetic fields, and one or more elements of magnetic material connected to or forming a part of the stylus, whereby the stylus is urged in opposite directions by alternative establishment of the magnetic fields.

The dual coil arrangement in addition to providing positive, independent positioning of the stylus also provides continuous heating of the stylus. This is desirable under the circumstances prescribed above and can easily be made of a desired value by proper design of the coils.

While a particular embodiment of the invention has been shown, it will be understood, of course, that the invention is not limited thereto since many modifications may be made, and it is, therefore, contemplated to cover by the appended claim any such modifications as fall within the true spirit and scope of the invention.

The invention having thus been described, what is claimed and desired to be secured by Letters Patent is:

In a tele-autograph system, having a pair of electrically interconnected stylus mechanisms; each of said mechanisms including first and second electromagnet coils in axial alignment and axially spaced with respect to each other, an elongated stylus having a writing point longitudinally movable into and out of engagement with a writing surface, said stylus having at least one portion of magnetic material movable within the fields of said coils whereby energization of said first coil urges said stylus out of contact with such writing surface and energization of said second coil urges said stylus into contact with such writing surface, a manually operable device for forcing said stylus into engagement with such writing surface against the urging of said second coil, a switch mechanically connected with said device and operable thereby, and a control circuit electrically connecting said switch of each stylus mechanism to said coils of the other of said stylus mechanisms and being operative to energize one coil of said receiving unit to force the associated stylus into contact with a writing surface when the stylus of said transmitting unit is manually forced into contact with a writing surface, and to energize the other coil of said receiving unit to raise the associated stylus away from a writing surface when the stylus of said transmitting unit is permitted to rise from a writing surface.

References Cited in the file of this patent

UNITED STATES PATENTS

| Number | Name | Date |
|---|---|---|
| 130,971 | Batchelder | Sept. 3, 1872 |
| 407,581 | Dewey | July 23, 1889 |
| 668,978 | Carlson | Feb. 26, 1901 |
| 1,851,850 | Lamar | Mar. 29, 1932 |
| 2,125,983 | Bettison et al. | Aug. 9, 1938 |
| 2,255,496 | Wyman | Sept. 9, 1941 |
| 2,282,929 | Billstein | May 12, 1942 |
| 2,332,511 | Glassman et al. | Oct. 26, 1943 |